United States Patent [19]

Seo et al.

[11] Patent Number: 5,763,866

[45] Date of Patent: Jun. 9, 1998

[54] OPTICAL READER FOR INFORMATION PATTERN REPRESENTING CODED DATA

[75] Inventors: Shuzo Seo; Nobuhiro Tani; Takeharu Shin; Makoto Nukui; Yukihiro Ishizuka, all of Tokyo, Japan

[73] Assignee: Asahi Kogaku Kogyo Kabushiki Kaisha, Tokyo, Japan

[21] Appl. No.: 649,773

[22] Filed: May 14, 1996

[30] Foreign Application Priority Data

May 16, 1995 [JP] Japan ................................ 7-141253

[51] Int. Cl.⁶ .......................................................... G06K 7/10
[52] U.S. Cl. ................................................ 235/472; 235/454
[58] Field of Search ....................................... 235/454, 472

[56] References Cited

U.S. PATENT DOCUMENTS 4,805,175  2/1989  Knowles ................................ 235/472
5,428,212  6/1995  Tani et al. .
5,589,678  12/1996  Atsumi et al. ........................ 235/472

Primary Examiner—Harold Pitts
Attorney, Agent, or Firm—Greenblum & Bernstein P.L.C.

[57] ABSTRACT

An optical reader having a reading head which includes a light source, an optical system and in imaging device such as a CCD. An opening is formed in a tip portion of the reading head which forms an area in which an information pattern to be read is positioned. The information pattern is illuminated by the light source, and the light reflected from the information pattern is sensed by the CCD. A closing plate is slidably supported by guide grooves provided on edge portions of the opening. The opening is opened and closed by the closing plate. The closing plate has a plurality of notches to provide flexibility.

6 Claims, 4 Drawing Sheets

1

OPTICAL READER FOR INFORMATION PATTERN REPRESENTING CODED DATA

BACKGROUND OF THE INVENTION

1. Field of the Invention

The present invention relates to an optical reader for optically reading an information pattern representing coded data. In particular, the present invention relates to an optical reader suitable for reading a two-dimensional information pattern representing coded data.

2. Description of the Related Art

Recently, a tessellated information pattern, in which black zones and white zones are two-dimensionally arranged to represent the coded data, has been proposes as a two-dimensional information pattern representing coded data. An optical reader for reading the coded data from the tessellated information pattern and for decoding the coded data has also been developed. The optical reader is frequently constituted as a hand held-type reader, and has a reading head including a hollow box-like head casing which has a bottom opening formed in a bottom wall thereof which defines a reading area. The reading head also includes a two-dimensional CCD (charge coupled device) image sensor and or associated optical system. Namely, the bottom opening is applied to the two-dimensional information pattern so that an image corresponding to the information pattern is sensed by the two-dimensional image sensor through the optical system.

In a conventional optical reader, however, since the bottom opening is always open, foreign matter such as dust enters the head casing, which may adhere to a surface of the optical system or the CCD image sensor. This may result in a noise component when reading the image signal corresponding to the information pattern, and thus, a reading error may occur.

SUMMARY OF THE INVENTION

Therefore, an object of the present invention is to provide an optical reader in which foreign matter does do not enter the head casing thereof to prevent a reading error in the optical reader from occurring.

According to the present invention, there is provided an optical reader for optically reading an information pattern representing coded data, comprising a casing, a reading device and a shutter mechanism. The casing has a reading head in which an opening is formed to be applied to the information pattern. The reading device reads an image of the information pattern, and is housed in the reading head. The shutter mechanism opens and closes the opening.

Further, according to the present invention, there is provided an optical reader for optically reading an information pattern representing coded data, comprising a reading head by which the information pattern is optically sensed, and a closing plate. The reading head is provided with an opening in which the information pattern is placed. The closing plate opens and closes the opening.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
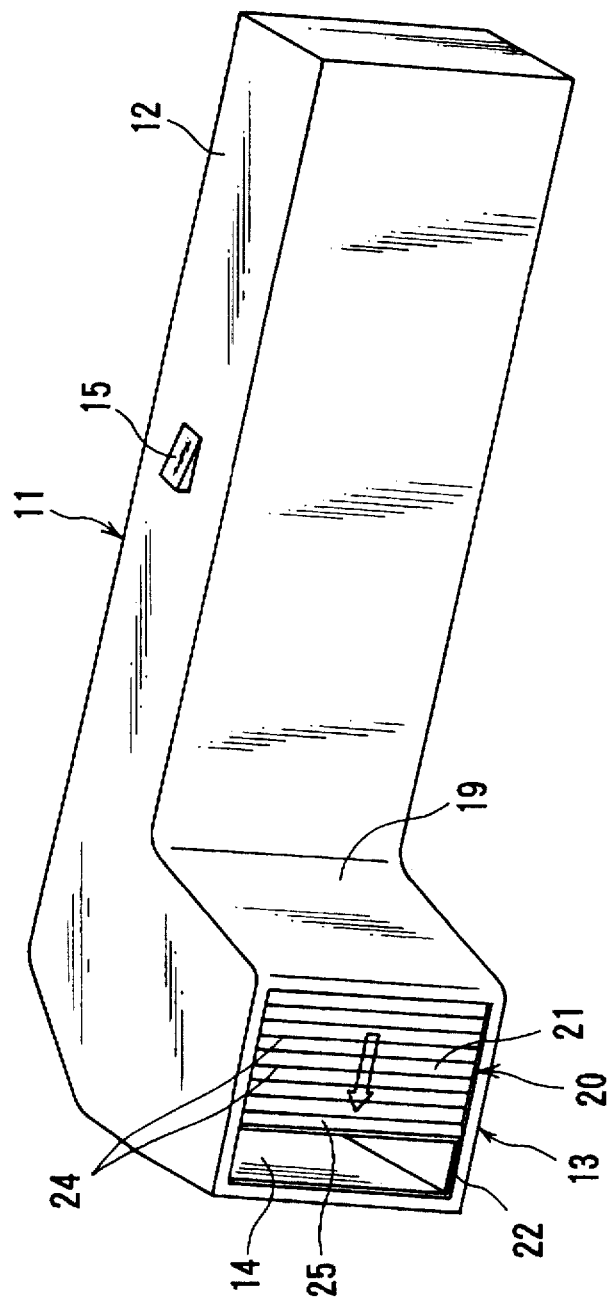
FIG. 1 is a perspective view showing an optical reader of an embodiment of the present invention.

FIG. 1 is an external view of an optical reader of an embodiment of the present invention.

The optical reader has a casing 11 which is approximately L-shaped. A long part of the L-shaped casing 11 is a held portion 12, and a short part of the L-shaped casing 11 is a reading head 13, which is connected to the held portion 12. A rectangular opening 14 is formed in a tip portion of the reading head 13 to be applied to a two-dimensional information pattern (not shown) to be read. A shutter mechanism 20 is provided in the reading head 13, and the opening 14 is fully opened when reading the information pattern. The held portion 12 is provided with a trigger switch 15 which is pressed to start a reading operation of the optical reader 10.

Figure 2:
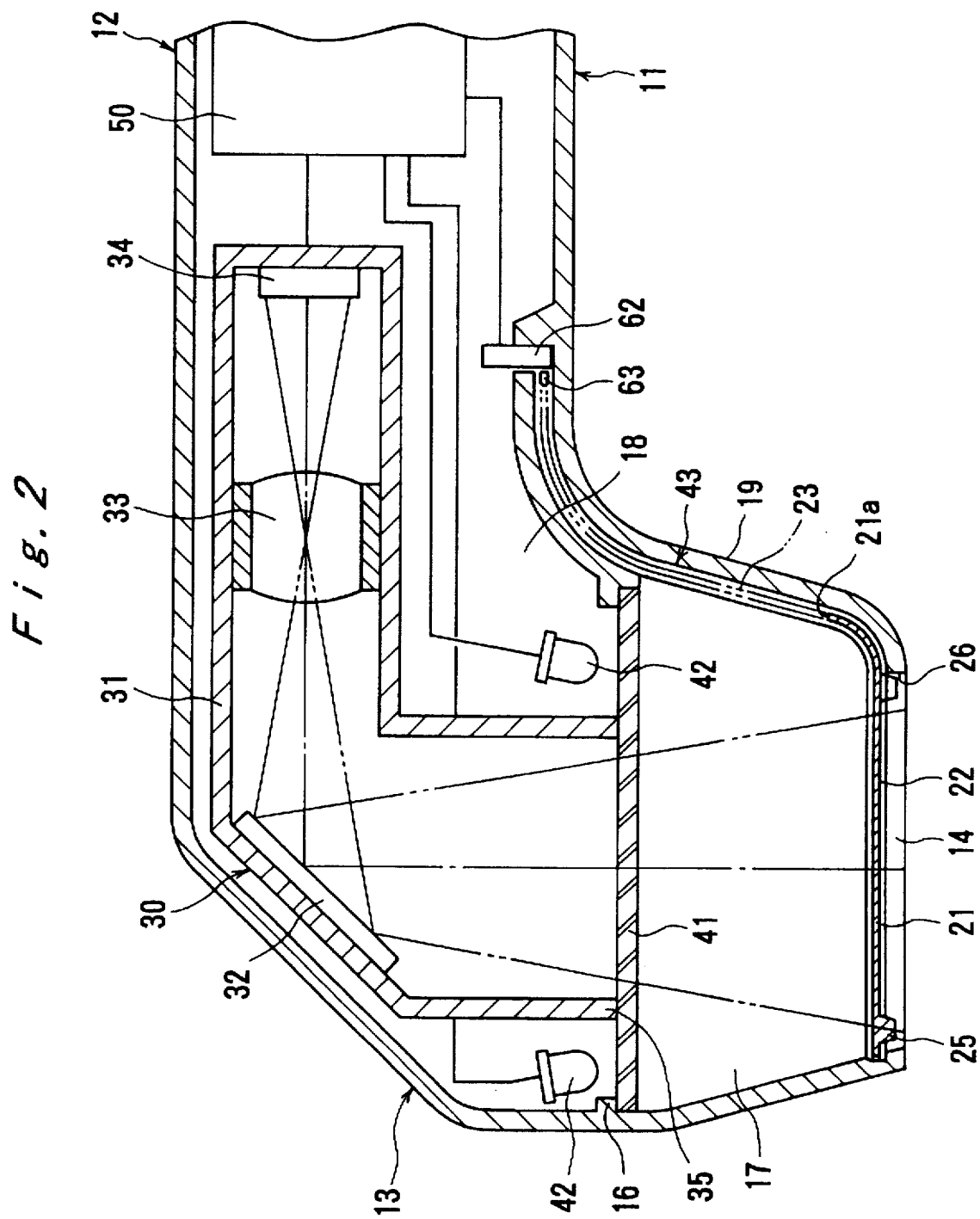
FIG. 2 is a sectional view showing the reading head of the optical reader shown in FIG. 1.

FIG. 2 is a sectional view of the reading head 13 of the optical reader. A reading unit 30 is housed in the reading head 13 to optically sense the information pattern. The reading unit 30 has a housing 31, in which a mirror 32, a lens or lens group 33 and a CCD 34 are housed. A sectional shape of the housing 31 is approximately L-shape. The mirror 32 is fixed on a wall formed at the corner portion of the L-shape, and the CCD 34 which is a two-dimensional image sensor is provided on a first end portion of the L-shape. The lens 33 is disposed between the mirror 32 and the CCD 34.

The housing 31 has a mouth 35 at a second end portion of the L-shape. The mouth 35 is fixed on a transparent plate 41 which is connected to a step 16 formed on an inner wall of the reading head 13. The transparent plate 41 may be made of glass or plastic material. An inner space of the reading head 13 is divided by the transparent plate 41 into a first space 17 in which the opening 14 is formed, and a second space 18 in which the reading unit 30 is housed. Due to the transparent plate 41, foreign matter such as dust and moisture cannot enter the second space 18.

A pair of light sources 42 are provided in the second space 18 and outside the housing 31 of the reading unit 30, so that illumination light can be radiated in the opening 14 through the transparent plate 41. The light sources 42 are symmetrically disposed about the center of the mouth 35, and face an upper surface of the transparent plate 41. Each of the light sources 42 may be a light emitting diode, a halogen lamp, a semiconductor laser or the like. A diffuser having a rough surface may be disposed to face the light sources 42 so that the information pattern placed in the opening 14 is uniformly illuminated. The diffuser can be obtained by applying a surface roughening onto a part of a surface of the transparent plate 41.

The light reflected by the information pattern placed in the opening 14 passes through the transparent plate 41, is reflected by the mirror 32, and is converged by the lens 33, so that an image corresponding to the information pattern is formed on a light receiving surface of the CCD 34, which generates an image signal corresponding to the image. The image signal is read from the CCD 34 and inputted into a signal processing circuit 50 disposed in the held portion 12, so that the coded data represented by the information pattern is decoded.

The CCD 34 has a plurality of photodiodes which are provided on the light receiving surface in a matrix arrangement and correspond to pixels of the image. In each of the photodiodes, an electric charge corresponding to the amount of received light is accumulated and read out from the CCD 34. The electric charge corresponds to an image signal of the image of the information pattern. Note that the CCD 34 must sense a luminance of each part of an information pattern DS (see FIG. 3), but other CCDs for sensing a color image can be used.

Figure 3:
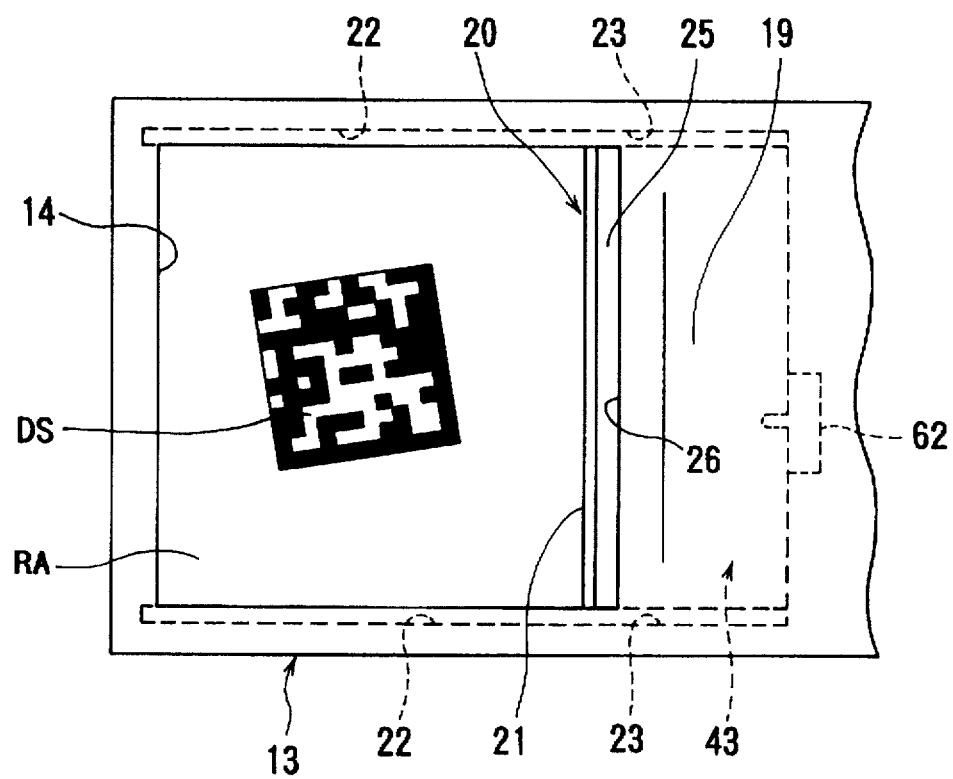
FIG. 3 is a plane view showing a tip portion of the reading head.

An example of the information pattern is shown in FIG. 3.

Namely, the information pattern DS is tessellated by two-dimensionally arranging black zones and white zones (or transparent zones) which show "1" or "0" in the binary system, for example, so that information is specified according to the arrangement of the black and white zones. Note that the information pattern DS is not restricted to the structure having the tesselated arrangement as shown in FIG. 3.

A reading area RA is defined on a plane on which the information pattern DS is placed, to which light is illuminated by the light sources 42. The light reflected from the reading area RA is sensed by the CCD 34 so that the coded data represented by the information pattern DS is sensed. The reading area RA is approximately coincident with the opening 14, or covers the opening 14.

The casing 11 of the reading head 13 functions so that an optical path length from the information pattern DS and the CCD 34 is kept at a predetermined value so that an image of the information pattern is clearly formed on the light receiving surface of the CCD 34 through the optical system including the mirror 32 and the lens 33. Namely, when the tip portion of the reading head 13 is in contact with the plane on which the information pattern DS is placed, the image of the information pattern is focused on the CCD 34. The casing 11 of the reading head 13 encloses an optical path of illumination light outputted from the light sources 42 and an optical path of light reflecting from the information pattern DS. A cross section of the casing 11 of the reading head 13, which section is parallel to the reading area RA, is a rectangle.

The shutter mechanism 20 has a closing plate 21, which is slidably supported by first guide grooves 22 and second guide grooves 23. The first guide grooves 22 are formed on a pair of edges of the opening 14, the edges being extended parallel to each other. The second guide grooves 23 are formed on an inner wall of the casing 11, and are sequentially formed to the first guide grooves 22, so that the closing plate 21 is guided along the inner wall of the casing 11 and into the reading head 13.

The rear ends of the second guide grooves 23 reach a boundary portion between the reading head 13 and the held portion 12, so that the closing plate 21 is guided along a rear wall 19 of the reading head 13, and can be housed in a closing plate housing portion 43 which is formed inside the rear wall 19. Since the closing plate housing portion 43 is housed along the inner wall surface of the rear wall 19, in a state in which the closing plate 21 is housed in the housing portion 43, the closing plate 21 does not interfere with the illumination light and the reflected light, and thus, a reading operation can be performed without disturbance from the closing plate 21.

The closing plate 21 has a plurality of notches 24 (see FIG. 1) which are extended perpendicular to a direction in which the closing plate 21 is moved along the first and second guide grooves 22 and 23. The notches 24 are formed at a constant interval, and each has a depth reaching a mid portion of the thickness of the closing plate 21 in such a manner that the closing plate 21 can be bent at the notches 24. Namely, the closing plate 21 is flexible along the second guide grooves 23 which are curved along the rear wall 19 of the reading head 13, so that the closing plate 21 can enter the casing 11 along the second guide grooves 23. Note that the notches 24 can be formed on one surface or both surfaces of the closing plate 21.

The closing plate 21 has a projection 25 at a leading edge 25 thereof. Namely, the projection 25 is formed on a portion close to a front end of the optical reader, and can be used for engaging a finger of the user to easily open and close the opening 14.

The projection 25 is engagable with a rear edge portion 26 of the opening 14 so as to prevent the leading edge of the closing plate 21 from entering and disappearing into the casing 11 when the opening 14 is fully opened. Thus, the opening and closing operations of the closing plate 21 can be repeatedly carried out, and further, when the closing plate 21 is opened, an excessive shock is prevented from acting on a power switch 62 disposed at a rear end portion of one of the second guide grooves 23.

The power switch 62 is provided for supplying an electric power to the optical reader. This power switch 62 is a normally-open type limit switch, and has an operation member 63 which is moved so that the power switch 62 is turned ON and OFF. The operation member 63 is pressed by a rear end 21a of the closing plate 21 when the closing plate 21 fully opens the opening 14, and thus the power switch 62 is turned ON. The operation member 63 is released from the closing plate 21 to open the power switch 62 when the closing plate 21 does not fully open the opening 14. Namely, the power switch 62 is turned ON and OFF in association with opening and closing operations of the closing plate 21.

Figure 4:
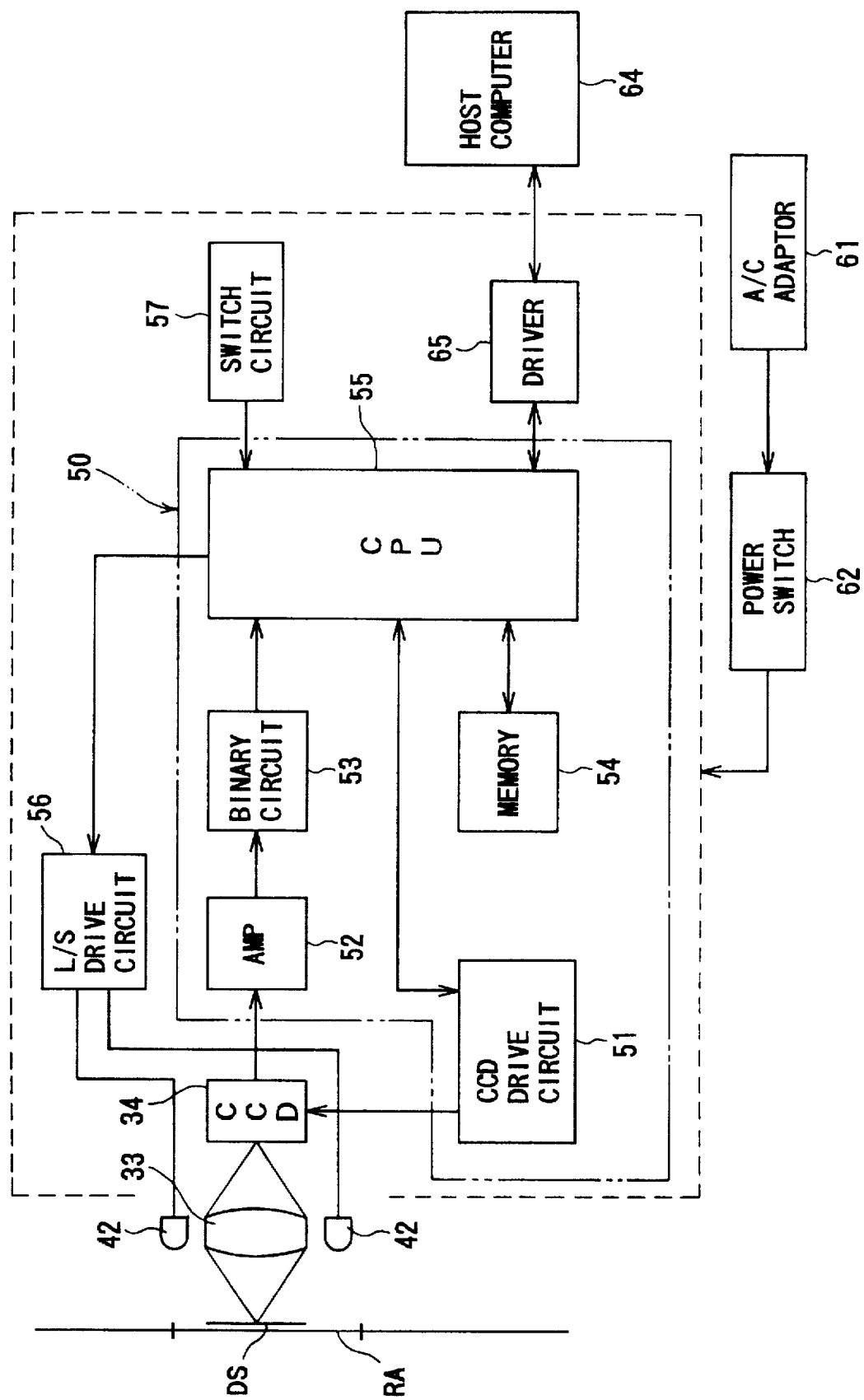
FIG. 4 is a block diagram of an electric circuit of the optical reader.

FIG. 4 shows an electric circuit provided in the optical reader. The signal processing circuit 50 is formed on a printed circuit board, and has a CCD drive circuit 51, an amplifier 52, a binary circuit 53, a memory 54 and a CPU 55, which are connected to each other through connecting lines formed on the print circuit board. A light source drive circuit 56 is provided for illuminating the light sources 42, and controlled by the CPU 55. A switch circuit 57 including the trigger switch 15 is connected to the CPU 55. Electric power is supplied from an A/C adaptor 61 through the power switch 62. A display device such as a liquid crystal display may be connected to the signal processing circuit 50 if necessary.

When the closing plate 21 is fully opened and the power switch 62 is turned ON, the light source drive circuit 56 is operated through the CPU 55 so that the light sources 42 are illuminated. The period in which the light sources 42 are illuminated may be determined by the light source drive circuit 56 or the CPU 55, to have a predetermined value. When the light sources 42 are illuminated and the trigger switch 15 is pressed to turn ON, a reading operation is carried out as follows.

First, the CCD drive circuit 51 is started to operate through the CPU 55, so that CCD horizontal driving pulses and CCD vertical driving pulses are outputted from the CCD drive circuit 51 to the CCD 34. At this time, compound clock signals are generated by the CCD drive circuit 51 in accordance with a horizontal synchronization signal, a vertical synchronization signal and a clock signal which is generated by the CCD drive circuit 51.

Accumulation of electric charges and transfer of the electric charges in the CCD 34 are controlled in accordance with the horizontal synchronization signal and the vertical synchronization signal. Analog image signals sequentially outputted by the CCD 34 are amplified by the amplifier 52, and converted to digital image signals by an A/D converter (not shown). The digital image signals are inputted into the binary circuit 53, in which the image signals are compared with a threshold value so that the image signals are converted to binary data. The binary data outputted by the binary circuit 53 are stored in predetermined addresses in the memory 54 in accordance with an address counter included in the CPU 55. The address counter is controlled in accordance with the compound clock signal generated by the CCD drive circuit 51.

The image data, i.e., the binary data stored in the memory 54 are read out therefrom in accordance with the addresses designated by the address counter. The image data of one frame are subjected to image processings such as a reversal process (between black and white) of the image, a detection of outline of the image (extracting only data related to the information pattern DS), a drop-out process and a rotation, in a calculation unit provided in the CPU 55. The processed image data are decoded in accordance with a system according to which the information pattern DS is formed, in a decoder provided in the CPU 55. The decoded data are outputted to a host computer 64 through a communication driver 65 which is connected to the CPU 55. In the computer 64, the decoded data are subjected to a predetermined process such as a statistic process.

Thus, when the reading operation of the information pattern DS has been completed, the closing plate 21 is moved so that the projection 25 parts from the rear edge portion 26 to close the opening 14. Due to this closing operation, the power switch 62 is turned OFF.

As described above, in a state in which the closing plate 21 closes the opening 14, if the projection 25 is pressed toward the rear edge portion 26 of the opening 14 with a finger of the user, the closing plate 21 is moved along the guide grooves 22 and 23 and housed in the closing plate housing portion 43, and thus, the opening 14 is opened. As shown by a chained line in FIG. 2, when the projection 25 comes into contact with the rear edge portion 26 of the opening 14, the opening 14 is fully opened and the closing plate 21 is completely housed in the closing plate housing portion 43, so that the rear end 21a of the closing plate 21 presses the operation member 63 of the power switch 62, and thus, the power switch 62 is turned ON.

In this state, if the closing plate 21 is moved so that the projection 25 parts from the rear edge portion 26 of the opening 14, the opening 14 is closed and the rear end 21a of the closing plate 21 parts from the operation member 63, and thus, the power switch 62 is turned OFF.

Therefore, when the optical reader is not used, the opening 14 is closed by the closing plate 21, so that foreign matter such as dust cannot enter the second space 18, and dust, dirt, finger prints and the like are prevented from adhering or forming on a surface of the transparent plate 41.

Further, in the shutter mechanism 20 in the embodiment, since the opening 14 is open and closed only by sliding the closing plate 21 in a direction parallel to the guide grooves 22 and 23, the opening and closing operations are very easy.

Still further, the optical reader is constructed in such a manner that the power switch 62 is turned ON and OFF in association with the opening and closing operations of the closing plate 21. Namely, since the ON-OFF operation of the power switch 62 does not need to be done separately from the opening and closing operations of the closing plate 21, the ease of operation of the optical reader is improved. Especially, since the power switch 62 is turned OFF by setting the closing plate 21 in a closing state when the optical reader is not used, the electric power consumed for the optical reader is reduced and each part of the optical reader is prevented from deteriorating.

Furthermore, in the embodiment, the power switch 62 is not turned ON until the closing plate 21 is fully open. Therefore, a reading operation is prohibited from being carried out when the closing plate 21 is partly open, and thus, a reading error is prevented.

Note that the shape of the casing 11 of the reading head 13 and the opening 14 are not restricted to a rectangle as shown in the drawings. For example, the shape can be a circle, an ellipse, or a polygon such as a triangle, a hexagon or an octagon. Further, the casing 11 can have a shape other than an L-shape.

The structure of the shutter mechanism 20 is not restricted to that shown in the drawings, but may have a plurality of shutter blades which open and close the opening 14.

The reading unit 30 may be constructed in such a manner that ambient light enters the reading head 13 to illuminate the reading area RA. In this case, the light sources 42 can be omitted, or may illuminate the reading area RA to supplement the ambient light.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-141253 (filed on May 16, 1995) which is expressly incorporated herein, by reference, in its entirety.

We claim:

1. An optical reader for optically reading an information pattern representing coded data, said reader comprising:

a reading head which optically senses said information pattern, said reading head being provided with an opening forming an area in which said information pattern is positioned for sensing;

a closing plate that opens and closes said opening, said opening being completely closed by said closing plate when said optical reader is not in use, whereby foreign matter is prevented from entering through said opening; and a power switch that actuates said optical reader, said power switch comprising a limit switch having an operation member, said power switch being turned ON and OFF in association with opening and closing of said closing plate, said operation member being engaged by said closing plate to close said limit switch when said closing plate fully opens said opening, and being released from said closing plate to open said limit switch when said closing plate is not fully opened.

2. An optical reader according to claim 1, wherein said reading head is positioned in a casing, said casing including first and second guide portions formed along opposite sides of said opening, said closing plate having a plurality of notches formed on a surface thereof, said notches extending perpendicular to said first and second guide portions so that said closing plate is flexible.

3. An optical reader according to claim 1, wherein said closing plate has a projection at a leading edge thereof, said projection being engagable with an edge portion of said opening to prevent said leading edge from entering said casing.

4. The optical reader according to claim 1, said reading head comprising a mechanism that reads an image of the information pattern, said mechanism comprising an imaging device and an optical system, the image of the information pattern being formed on said imaging device through said optical system.

5. The optical reader according to claim 1, said closing plate being flexible so as to move along a curvlinear guide portion provided in said reading head.

6. The optical reader according to claim 1, said information pattern comprising a two-dimensional data pattern.

* * * * *